(12) United States Patent
Borkholder et al.

(10) Patent No.: US 11,161,446 B2
(45) Date of Patent: Nov. 2, 2021

(54) FLOOR JOINT FOR MULTIPLE ROOM CONNECTION FOR VEHICLES

(71) Applicant: Newmar Corporation, Nappanee, IN (US)

(72) Inventors: Chet Borkholder, Nappanee, IN (US); John Sherman, Nappanee, IN (US); Ron Stichter, Nappanee, IN (US)

(73) Assignee: Newmar Corporation, Nappanee, IN (US)

( * ) Notice: Subject to any disclaimer, the term of this patent is extended or adjusted under 35 U.S.C. 154(b) by 66 days.

(21) Appl. No.: 16/800,331

(22) Filed: Feb. 25, 2020

(65) Prior Publication Data

US 2021/0261038 A1    Aug. 26, 2021

(51) Int. Cl.
*B60P 3/34*    (2006.01)
*B62D 24/04*    (2006.01)
*B62D 25/20*    (2006.01)

(52) U.S. Cl.
CPC .............. *B60P 3/34* (2013.01); *B62D 24/04* (2013.01); *B62D 25/20* (2013.01)

(58) Field of Classification Search
CPC ... B60P 3/32; B60P 3/34; B62D 25/20; B62D 33/0612; B62D 47/025; B62D 24/04
USPC .................................. 296/164, 165; 297/15
See application file for complete search history.

(56) References Cited

U.S. PATENT DOCUMENTS

| | | | |
|---|---|---|---|
| 4,620,741 A * | 11/1986 | Hanemaayer | B60P 3/36 108/150 |
| 4,869,178 A * | 9/1989 | Bechu | B60D 5/006 105/15 |
| 6,983,985 B2 * | 1/2006 | McGowan | B60N 2/3011 296/66 |
| 7,066,474 B2 | 6/2006 | Hiebert et al. | |
| 7,322,629 B2 * | 1/2008 | McClintock | B60N 2/3075 16/324 |
| 7,624,995 B2 | 12/2009 | Barbison | |
| 7,730,586 B2 * | 6/2010 | McDonald | E05D 7/009 16/326 |
| 9,469,349 B1 * | 10/2016 | Mather | B60N 2/12 |
| 2003/0234556 A1 * | 12/2003 | Baggett | B62D 33/0612 296/190.02 |
| 2007/0102946 A1 * | 5/2007 | Blackwell | A61G 3/001 296/24.38 |
| 2014/0001786 A1 * | 1/2014 | Cantin | E04B 1/3442 296/26.14 |
| 2017/0197667 A1 * | 7/2017 | Kabayama | B62D 25/2027 |
| 2018/0079348 A1 * | 3/2018 | Ronsen | B60P 3/34 |
| 2018/0162259 A1 * | 6/2018 | Lin | B60P 3/39 |
| 2020/0239068 A1 * | 7/2020 | Butted | B62D 7/06 |
| 2021/0070215 A1 * | 3/2021 | McCoy, Jr. | B60P 3/34 |

OTHER PUBLICATIONS

Newmar Corporation, "2020 Super Class C Supreme Aire" product literature, undated, (24 pages).

* cited by examiner

*Primary Examiner* — Gregory A Blankenship
(74) *Attorney, Agent, or Firm* — Faegre Drinker Biddle & Reath LLP

(57) ABSTRACT

A joint is connected between floors of a vehicle that are movable relative to each other. The joint includes a plurality of hinged segments to accommodate vertical and longitudinal relative motion between the floors. At least one of the hinged segments includes a flat, walkable surface aligned with the floors.

20 Claims, 5 Drawing Sheets

FLOOR JOINT FOR MULTIPLE ROOM CONNECTION FOR VEHICLES

TECHNICAL FIELD

The present disclosure relates, generally, to recreational vehicles ("RVs") and, more specifically, to features for providing a joint assembly between floors that are capable of movement relative to each other.

BACKGROUND

RVs can include living quarters that are mounted to a chassis, which has been built for a variety of different purposes. For Class C RVs (e.g., as defined by the Recreational Vehicle Industry Association and including "Super C" RVs), the chassis can include a cab provided by the chassis manufacturer to which the living quarters of the RV are then attached by the RV manufacturer. In some instances, the cab can be made with an "air ride" system that allows the cab to move significantly to dampen the effects of vehicular vibration, road obstructions, etc., and therefore provide a more comfortable ride to passengers in the cab. This results in the floor of the cab being movable, at least vertically and longitudinally, with respect to the chassis.

When the living quarters of the RV are attached to the cab, it is usually desirable to have the cab and the living quarters connected such that the vehicle operators and passengers can easily move between the cab and the living quarters, even during vehicle movement. However, for a variety of reasons (including the desirability of using rigid floor tiles), the floor of the living quarters is usually fixed with respect to the chassis or a rigid underframe of the living quarters. As a result, the floor of the cab and the floor of the living quarters would typically be subject to relative motion. Such motion can complicate the connection joint needed between them and/or result in substantial discontinuity of the floor elevation.

Certain prior approaches simply disable or remove the "air ride" structure for the cab to obviate the above-described complications and to facilitate cost-effective and weather-tight joints between the cab and the living quarters. However, this results in the comfort level of driving the RV being adversely affected, particularly for users operating the RV over rough roads and/or operating the RV for long periods of time.

SUMMARY

In certain embodiments, an enclosure includes a first floor and a second floor with the first floor being movable with respect to the second floor. The enclosure further includes a joint connected between the first floor and the second floor such that the joint provides a flat surface between the first floor and the second floor.

In certain embodiments, a recreational vehicle includes a cab having a first floor and a living quarter having a second floor. The first floor is movable in a vertical direction relative to the second floor. The recreational vehicle further includes a joint assembly coupled between the first floor and the second floor and arranged to accommodate the vertical motion of the first floor with respect to the second floor.

In certain embodiments, a recreational vehicle includes a first floor and a second floor with the first floor being movable with respect to the second floor. The recreational vehicle includes means for accommodating relative vertical motion and longitudinal motion between the first floor and the second floor.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
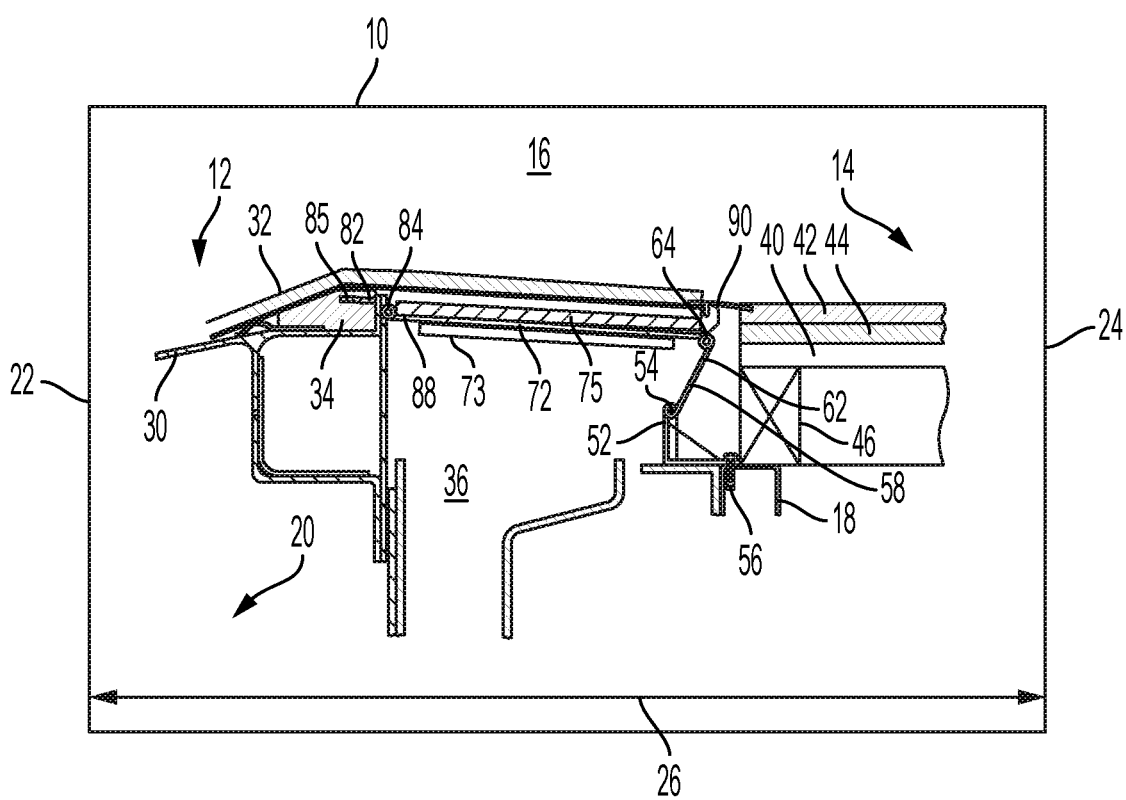
FIG. 1 shows a longitudinal cross-sectional view of a joint, in accordance with certain embodiments of the present disclosure.

The drawings are not necessarily to scale from one figure to the next. Multiple embodiments are shown in the drawings, with like numbers denoting components with like purposes. Further, while the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

As described above, the floor of a cab of an RV and the floor of the living quarters of the RV may be subject to relative motion, which can result in substantial discontinuity of the elevation of the floors. One approach for accommodating for the relative motion involves incorporating a "step-down" in the floor between the cab and the living quarters. However, a step-down limits integration of the cab chairs and furnishings into the living quarters. Further, a step-down can create movement impediments or hazards within the enclosure of the RV. For example, given the limited space within an RV, certain features of the RV may have multiple uses. A driver's seat or cab front passenger's seat, for instance, could be pivotable when the RV is not moving to be a living quarters seat as well. Similarly, a front passenger's convenience console could be transformed to be a side table furnishing for use in the living quarters when the RV is parked. As such, a step-down in the floor between the cab and the living quarters can limit the dual-purpose capability of such seats and consoles and/or require additional cost and heavy structural supports to implement. Further yet, a step-down creates an elevational change in the floor which can require extra attention and care by users to avoid tripping when moving between the living quarters and the cab portion.

In addition to the above-described relative motion, in Class C RVs, the connection between the cab and the living quarters limits the ability of RV manufacturers to provide a fully open connection between the cab and the living quarters. This can be an aesthetic impediment or detraction from the standpoint of RV users, given the compact space of the living quarters. Where an RV is intended for extended periods of use, and/or use by a greater number of passengers, such aesthetic concerns can be significant. For example, if the cab was fully open with respect to the living quarters, and on the same floor plane, the windshield of the vehicle could more readily be seen as a picture window structure which reduces the tendency of the living quarters to seem overly confining to users when the RV is parked for a significant period of time.

Certain embodiments of the present disclosure are accordingly directed to approaches for providing an open arrangement and substantially constant elevation between floors of the cab and living quarters and/or for accommodating the relative movements between the cab and living quarters.

Figure 2:
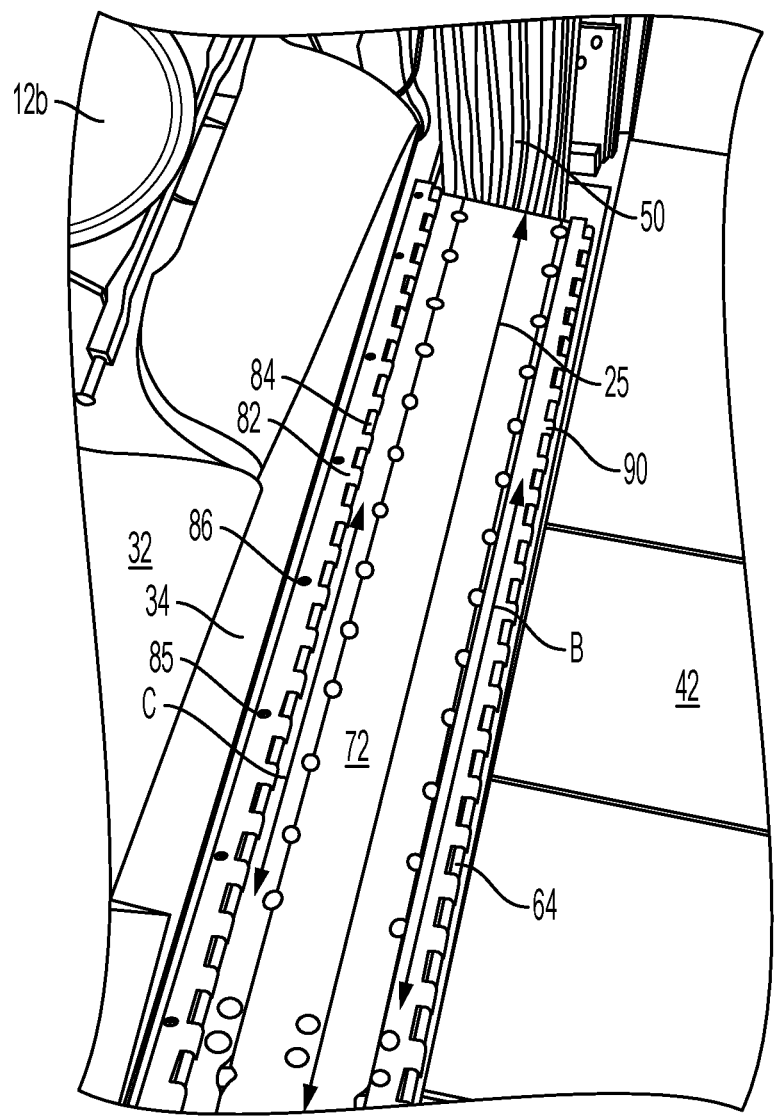
FIG. 2 shows an upper left side, rearward perspective view of portions of the joint of FIG. 1, in accordance with certain embodiments of the present disclosure.
Figure 4:
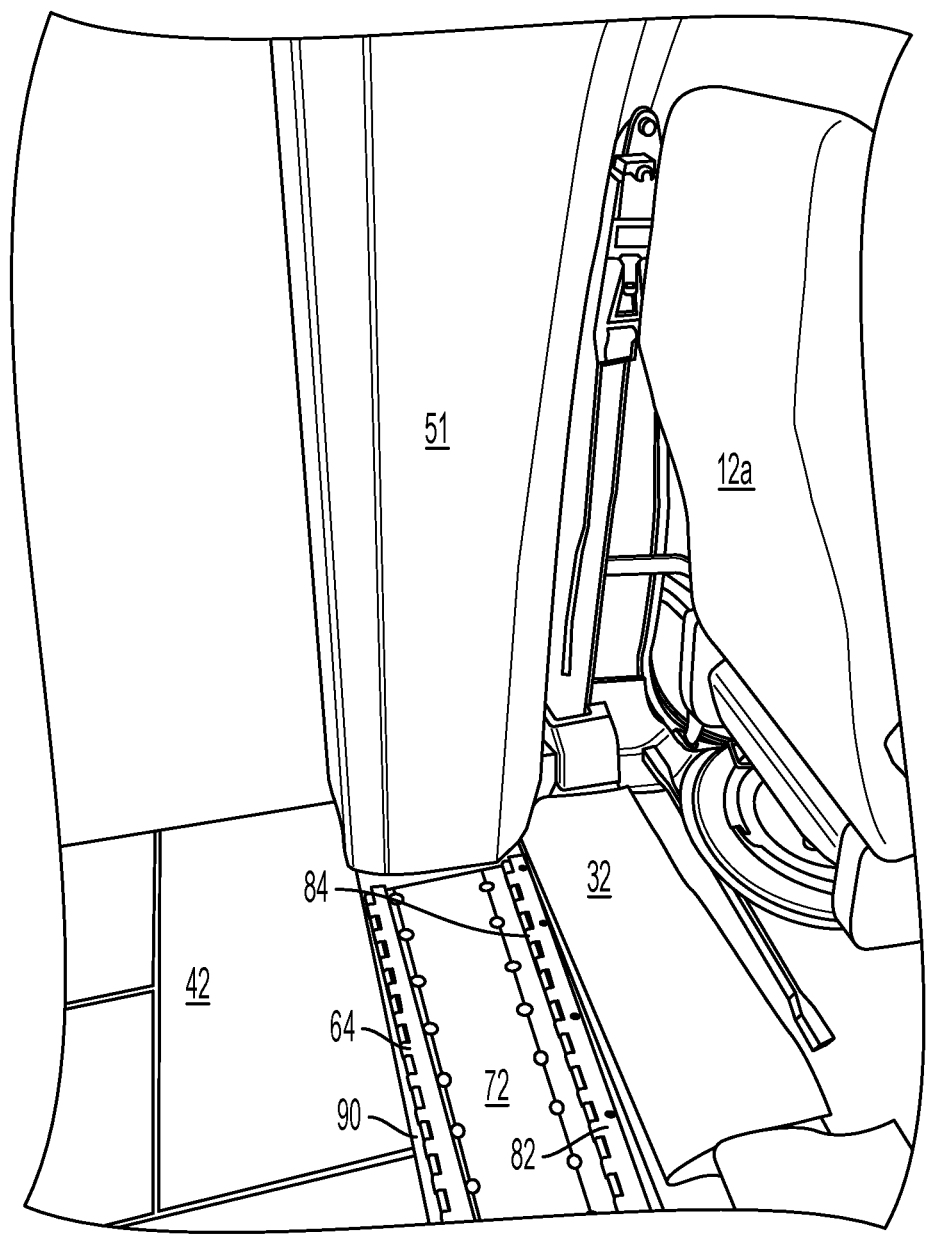
FIG. 4 shows an upper right side perspective view of portion of the joint of FIGS. 1-3, in accordance with certain embodiments of the present disclosure.
Figure 5:
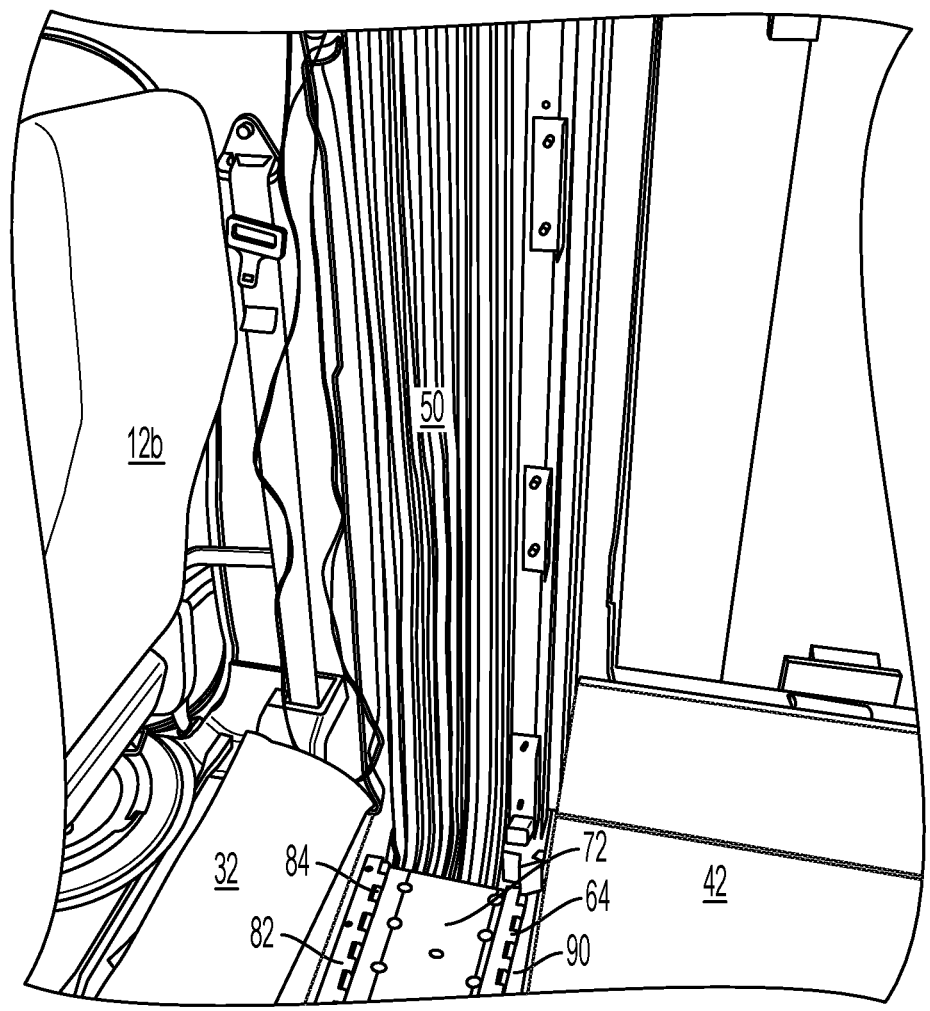
FIG. 5 shows an upper left side perspective view of portions of the joint of FIGS. 1-4, in accordance with certain embodiments of the present disclosure.

FIG. 1 shows a vehicle 10 (e.g., an RV such as a Class C RV, including Super C RVs, which are larger Class C RVs mounted on larger truck chassis) with a cab portion 12 that is vertically movable within the vehicle 10. Within the cab 12, the vehicle 10 includes a cab driver's seat 12a (shown in FIG. 4) and a cab passenger seat 12b (shown in FIGS. 2 and 5).

The vehicle 10 further includes living quarters 14 (e.g., a compartment or portion of the vehicle's enclosure with features such as furniture, a kitchen, a restroom, and the like). The living quarters 14 are connected to the cab 12 and are in communication with the cab 12 such that passengers can move between the living quarters 14 and the cab 12. Together, the living quarters 14 and the cab 12 create an enclosure 16 of the vehicle 10.

The vehicle 10 includes a chassis 18 and a suspension system 20 underneath and supporting the cab 12. In certain embodiments, the suspension system 20 is an air-ride system. Air-ride systems are powered by an electric or engine-driven air pump or compressor, which pumps air into flexible bags or bellows. The air-filled bags allow the cab 12 to move with respect to the chassis 18 to dampen vibrations, bumps, etc. as the vehicle 10 passes over different terrain. However, as mentioned above, air-ride systems also allow floors of the cab 12 and the living quarters 14 to move relative to each other. In particular, as the cab 12 moves, the floor of the cab 12 can move with respect to the chassis 18 while the floor of the living quarters 14 remains fixed with respect to the chassis 18.

The vehicle 10 has a front side 22, a rear or back side 24, and a longitudinal length 26 extending between the front side 22 and the back side 24. The vehicle 10 has a lateral width, which extends perpendicular to the longitudinal length 26.

The cab 12 includes a first floor 30 that is positioned vertically above the suspension system 20. The first floor 30 may be at least partially covered by a first floor covering 32 (e.g., carpet, tile, and the like). The cab 12 includes a mounting strip 34 for receiving fasteners. A joint assembly 36 or joint is positioned between the cab 12 and the living quarters 14 and connects the cab 12 and the living quarters 14 together. The living quarters 14 include a second floor 40, which may be at least partially covered with a second floor covering 32. The living quarters 14 further include a subfloor 44 (e.g., a tile support layer), a support structure 46 (e.g., a rigid frame) connected to the chassis 18.

Figure 3:
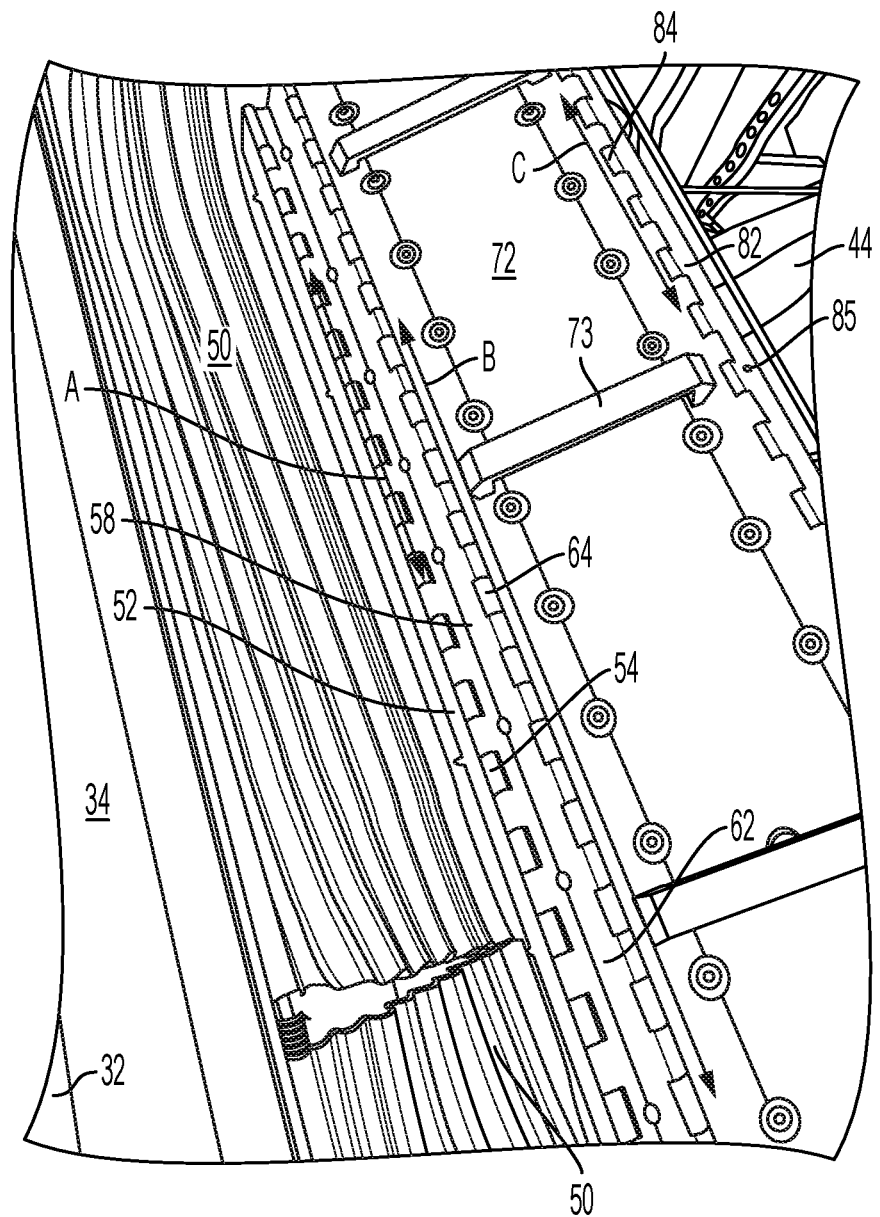
FIG. 3 shows an upper left side, forward perspective view of portions of the joint of FIGS. 1 and 2, in accordance with certain embodiments of the present disclosure.

The joint assembly 36 includes a first segment 52, which is fastened to the chassis 18 at one end by fasteners 56 (e.g., screws). The joint assembly 36 further includes a first hinge array 54 extending along axis A (shown in FIG. 3) across the lateral width of the vehicle 10. The joint assembly 36 further includes a second segment 62, which may include a weld seam 58 for ease of manufacturing. A second hinge array 64 can extend along axis B (shown in FIG. 3) across the lateral width of the vehicle 10. The joint assembly 36 further includes a third segment 72, which may include one or more weld seams 88 for ease of manufacturing. A plurality of braces 73 can be positioned on the underside of the third segment 72. A spacing element 75 (e.g., a carpet pad) can be positioned on the top of the third segment 72. The joint assembly 36 further includes a fourth segment 82, which may be fastened to the mounting strip 34 via fasteners 86 through a plurality of spaced-apart holes 85. A third hinge array 84 extends along axis C (shown in FIG. 2). The joint assembly 36 further includes a gap-closing extension 90, which contacts the second floor covering 32, and a flexible boot 50 (shown in FIGS. 3 and 5) mounted about the periphery of the junction between the cab 12 and living quarters 14, and a boot cover 51 (shown in FIG. 4) that is more rigid than the flexible boot 50.

The first segment 52 of the joint assembly 36 is connected to the second segment 62 via the first hinge array 54. The second segment 62 is connected to the third segment 72 via the second hinge array 64. And, the third segment 72 is connected to the fourth segment 82 via the third hinge array 84. Each hinge array is, for example, a plurality of closely-spaced hinges aligned along a common axis of rotation (e.g., axes A, B, and C, respectively), each of which may be aligned to be parallel with the lateral width of the vehicle 10. As one example, the hinge arrays can be a piano-hinge-type hinge.

The joint assembly 36 uses the three hinge arrays (e.g., the first hinge array 54, the second hinge array 64, and the third hinge array 74) in combination to accommodate relative longitudinal motion (e.g., motion along the longitudinal length 26) and relative vertical motion between the first floor 30 and the second floor 40. In certain embodiments, the spacing of the individual hinges (e.g., the individual hinges in a piano hinge) of the hinge arrays 54, 64, and 74 and/or the material composition and internal dimensions of the hinge arrays 54, 64, and 74 permit some relative lateral motion between the first floor 30 and the second floor 40.

The hinged arrays 54, 64, and 74 extend along the lateral width of the vehicle 10 but need not be completely co-extensive with the lateral width. In certain embodiments, the top surface of the third segment 72 serves to provide a flat, walkable surface between the first floor 30 and the second floor 40, substantially maintaining elevational continuity for passengers. Although the joint assembly 36 is described as providing a flush or elevationally-constant connection or transition between the first floor 30 and the second floor 40, the joint assembly 36 can provide a modest slope (as shown in FIG. 1).

In certain embodiments, the spacing element 75 is not included or can be of a greater or lesser thickness for a given application. Similarly, the gap-closing extension 90 can be of a variety of thickness and may be omitted entirely in certain applications. For example, if the first floor covering 32 is a layer of carpet, the carpet may extend to contact the second floor covering 42 directly. In embodiments where the second floor covering 42 is ceramic tile, the subfloor 44 and/or the support structure 46 is preferably rigid so as to reduce cracking stresses on the ceramic tile. In embodiments where the second floor covering 42 is carpet or linoleum, for example, the subfloor 44 and/or the support structure 46 can be less rigid. Similarly, in given applications, the support structure 46 can be rigidly or flexibly mounted to the chassis 18, according to the needs of the second surface treatment 42. Also similarly, in embodiments, the mounting strip 34 can be omitted, and the fourth segment 82 can be fastened directly to the first floor 30. In other embodiments, the fourth segment 82 is not fastened directed to the first floor 30 and instead is left to "float" or rest on a portion of floor 30 to help accommodate additional lateral motion between the cab 12 and the living quarters 14.

Another advantage of the illustrated embodiments is that if any servicing of the joint assembly 36 is needed, the servicing can be handled within the enclosure 16 of the vehicle 10, such as by removing or lifting up the one or more of the floor coverings and loosening the connection of the fourth segment 82 to the first floor 30 and/or the mounting strip 34. In other applications, it may be desirable to connect the joint assembly 36 such that servicing is done on the exterior of the vehicle 10.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. For example, the present invention can be readily adapted for use with an enclosure of other types of vehicles, where there are relatively movable portions of the flooring system, and also with static structures having such flooring systems. Also, in certain applications a greater or lesser number of hinge arrays and joint segments can be used. Accordingly, the scope of the present disclosure is intended to include all such alternatives, modifications, and variations as falling within the scope of the claims, together with all equivalents thereof.

What is claimed is:

1. A vehicle comprising:
   a cab containing a first floor;
   a living quarter containing a second floor, with the first floor being movable with respect to the second floor; and
   a joint connected between the first floor and the second floor such that the joint provides a flat surface between the first floor and the second floor,
   wherein the vehicle is a Class C recreational vehicle.

2. The vehicle of claim 1, wherein the vehicle includes a lateral width and a longitudinal length that extends perpendicular to the lateral width.

3. The vehicle of claim 2, wherein the joint includes hinge segments each with multiple hinges along the lateral width.

4. The vehicle of claim 3, wherein the multiple hinges are piano hinges.

5. The vehicle of claim 3, wherein the multiple hinges extend substantially along the entirety of the lateral width.

6. The vehicle of claim 3, wherein the second floor is fixed to a support structure, wherein the hinge segments include a first hinge segment fixed to the support structure, a second segment connected to the first hinge segment via a first hinge array, a third hinge segment connected to the second hinge segment via a second hinge array, and a fourth hinge segment connected to the third hinge segment via a third hinge array.

7. The vehicle of claim 6, wherein the fourth hinge segment is fixed to the first floor.

8. The vehicle of claim 6, wherein the hinge segments are connected to each other to accommodate vertical and longitudinal relative motion between the first floor and the second floor.

9. The vehicle of claim 1, the vehicle further comprising:
   an air-ride suspension system arranged to support the cab and dampen vibration.

10. The vehicle of claim 1, wherein the joint is configured to permit limited, relative vertical motion of the first floor with respect to the second floor.

11. The vehicle of claim 1, further comprising:
    a chassis rigidly coupled to the second floor; and
    an air-ride suspension system configured to actively dampen vibration and coupled to the first floor, wherein the first floor is movable in a vertical direction relative to the chassis.

12. The vehicle of claim 11, wherein the first floor has a first floor covering comprising carpet, wherein the second floor has a second floor covering comprising ceramic tile.

13. A recreational vehicle comprising:
    a cab having a first floor;
    a living quarter having a second floor, wherein the first floor is movable in a vertical direction relative to the second floor; and
    a joint assembly coupled between the first floor and the second floor and arranged to accommodate vertical motion of the first floor with respect to the second floor.

14. The recreational vehicle of claim 13, further comprising:
    a suspension system arranged to support the cab and dampen vibration.

15. The recreational vehicle of claim 14, wherein the suspension system is an air-ride suspension system.

16. The recreational vehicle of claim 13, further comprising:
    a chassis arranged to support the second floor, wherein the first floor is movable in the vertical direction relative to the chassis.

17. The recreational vehicle of claim 16, wherein the second floor is rigidly coupled to the chassis.

18. The recreational vehicle of claim 13, wherein the first floor has a first floor covering comprising carpet, wherein the second floor has a second floor covering comprising ceramic tile.

19. The recreational vehicle of claim 13, wherein the joint assembly includes a flat surface between the first floor and the second floor.

20. A recreational vehicle comprising:
    a first floor;
    a second floor, with the first floor being movable with respect to the second floor;
    means for accommodating relative vertical motion and longitudinal motion between the first floor and the second floor.

* * * * *